United States Patent [19]

Hosseini

[11] Patent Number: 5,165,377
[45] Date of Patent: Nov. 24, 1992

[54] HYDRAULIC FAN DRIVE SYSTEM
[75] Inventor: Javad Hosseini, Peoria, Ill.
[73] Assignee: Caterpillar Inc., Peoria, Ill.
[21] Appl. No.: 819,703
[22] Filed: Jan. 13, 1992
[51] Int. Cl.$^5$ ................................................ F01P 7/02
[52] U.S. Cl. .................................... 123/41.12; 165/39
[58] Field of Search .............. 123/41.12, 41.11, 41.33, 123/41.49; 165/39, 40; 60/329, 420

[56] References Cited

U.S. PATENT DOCUMENTS

| | | | |
|---|---|---|---|
| 3,465,538 | 9/1969 | Wunder | 62/184 |
| 4,066,047 | 1/1978 | Vidakovic et al. | 123/41.12 |
| 4,223,646 | 9/1980 | Kinder | 123/41.11 |
| 4,479,532 | 10/1984 | Watanabe | 165/39 |
| 4,487,255 | 12/1984 | Bianchetta et al. | 165/39 |
| 4,798,177 | 1/1989 | Oomura et al. | 123/41.12 |
| 4,823,744 | 4/1989 | Omura | 123/41.12 |

Primary Examiner—Noah P. Kamen
Attorney, Agent, or Firm—James R. Yee

[57] ABSTRACT

A system is provided for operating a fan to move air past a heat exchanger. The fan is driven by hydraulic fluid supplied from a pressure compensated pump. Such fluid driven fan systems are commonly utilized on industrial vehicles and on stationary engines having fluid type systems. The system controllably operates the fan at relatively high speed in response to the temperature of least one of the fluid coolant and hydraulic fluid being greater than respective first and second predetermined upper temperature values, and controllably operates the fan at a second relatively slow speed in response to the temperature of each of the fluid coolant and hydraulic fluid being less than respective first and second predetermined lower temperature values. The system also controllably continues to operate the fan at the instant fan speed in response to the temperature of at least one of the fluid coolant and hydraulic fluid being between the respective first and second predetermined upper and lower temperature values and to neither of the fluid coolant and hydraulic fluid temperatures being greater than the respective first and second predetermined upper temperature values.

6 Claims, 2 Drawing Sheets

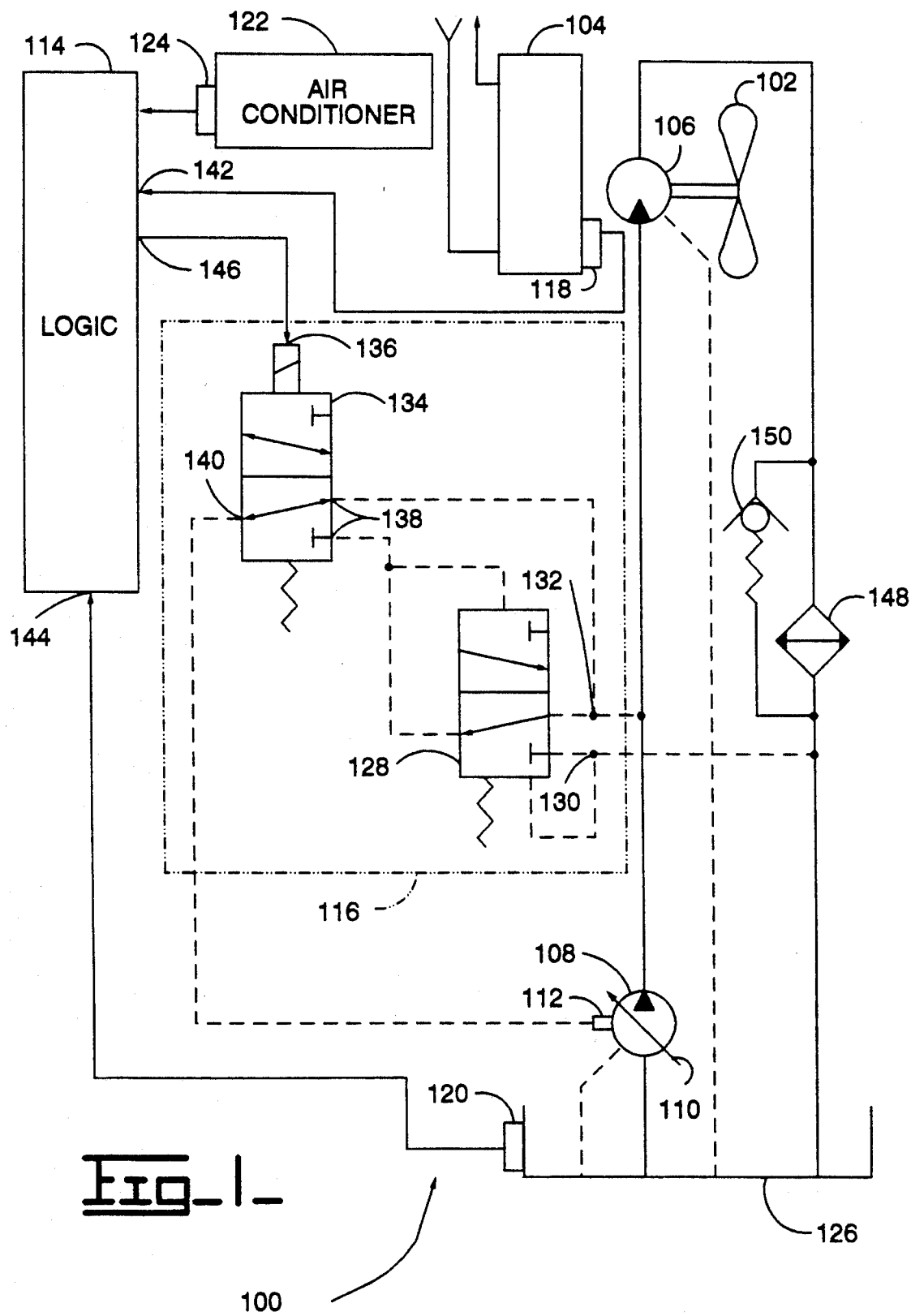
Fig_1_

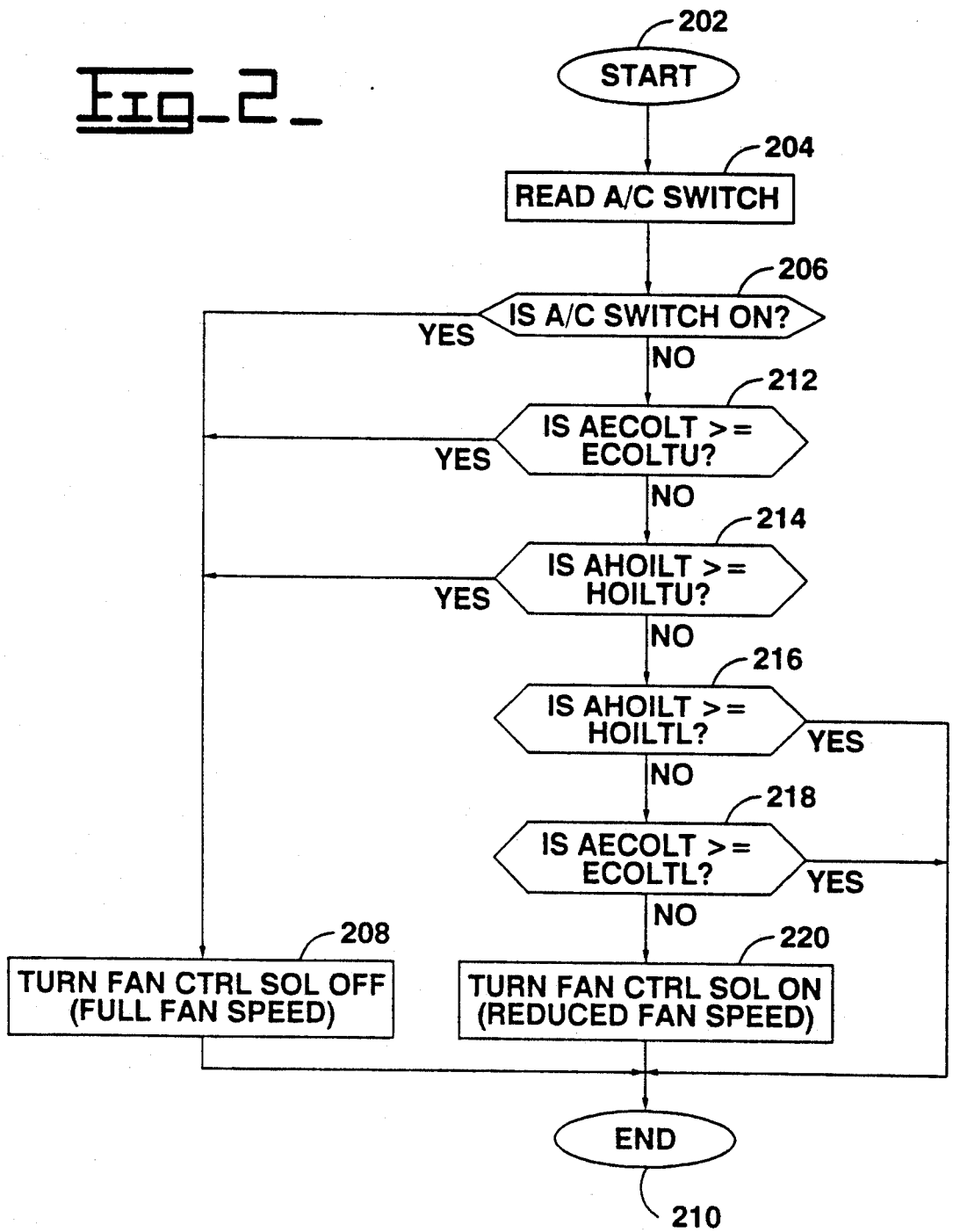
Fig_2_

HYDRAULIC FAN DRIVE SYSTEM

DESCRIPTION

1. Technical Field

This invention relates generally to a system for operating a fan, and, more practically, to a system for operating a hydraulically driven fan in response to various temperatures sensed within the fan drive system.

2. Background Art

Vehicles having fluid cooled engines typically include an engine driven fan arranged to move air across a heat exchanger. The engine coolant picks up heat from the engine and circulates through the heat exchanger, which cools the fluid and readies it for another cycle through the engine. In various types of commercial equipment the fan is advantageously operated by a hydraulic motor, allowing the heat exchanger and fan assembly to be located at any convenient point on the vehicle.

It is advantageous to operate the cooling fan at a speed proportional to that necessary to sufficiently cool the vehicle engine. Such controlled operation enables the vehicle engine to operate in a desired temperature range and also serves to conserve fuel. Therefore, a fan drive system advantageously responds to the temperature of the engine coolant and to the temperature of the hydraulic fluid driving the fan.

Prior systems have recognized both the value of hydraulically operated fan motors and the advantage of controllably operating the fan at speeds responsive to engine coolant and hydraulic fluid temperature. For example, U.S. Pat. No. 4,798,177 issued Jan. 17, 1989 to Oomura et al. discusses a cooling fan for an internal combustion engine that is hydraulically driven and that has a rotational speed control responsive to the operating temperature of the engine and the operating temperature of the hydraulic fluid. The flow rate of the hydraulic fluid is increased when the temperature of the engine or the temperature of the hydraulic fluid increases. However, this continuously variable fan control is unnecessarily complex and expensive to implement. It is advantageous to utilize a fan drive system that achieves the desired result of optimally cooling an engine with a simple and relatively maintenance free design.

The present invention is directed to overcoming one or more of the problems as set forth above.

DISCLOSURE OF THE INVENTION

In one embodiment of the present invention, a system for operating a fan to move air past a heat exchanger containing fluid coolant is provided. The fan is connected to a fluid motor that is powered by hydraulic fluid supplied from a pressure compensated pump. The pump has a variable displacement controllable element connected to and controlled by a load sensing member. The system controllably operates the fan at a relatively high speed in response to the temperature of at least one of the fluid coolant and hydraulic fluid being greater than respective first and second predetermined upper temperature values, and operates the fan at a second relatively slow speed in response to the temperature of each of the fluid coolant and hydraulic fluid being less than respective first and second predetermined lower temperature values. The system controllably continues to operate the fan at the most recent instant fan speed in response to the temperature of at least one the fluid coolant and hydraulic fluid being between the respective first and second predetermined upper and lower temperatures values, and to neither of the fluid coolant and hydraulic fluid temperatures being greater than the respective first and second upper temperature values.

In a second aspect of the present invention, a method is provided for operating a fan to move air past a heat exchanger containing fluid coolant. The fan is operatively connected to a fluid motor powered by hydraulic fluid supplied from a pressure compensated pump. The pump has a variable displacement controllable element connected to and controlled by a load sensing member. The method comprises the steps of controllably operating the fan at a relatively high speed in response to at least one of the fluid coolant and hydraulic fluid temperatures being greater than respective first and second predetermined upper temperature values, and controllably operating the fan at second relatively slow speed in response to each of the fluid coolant and hydraulic fluid temperatures being less than respective first and second predetermined lower temperature values. The method also includes the step of controllably continuing to operate the fan at the instant fan speed in response to at least one of the fluid coolant and hydraulic fluid temperatures being between respective first and second predetermined upper and lower temperature values and to neither of said fluid coolant and hydraulic fluid temperatures being greater than the respective first and second predetermined upper temperature values.

The present invention provides a fan control system that is advantageously fuel efficient, simple to implement with commonly available hydraulic components, and that functions to control an engine temperature within a desirable temperature range.

BRIEF DESCRIPTION OF THE DRAWINGS

For a better understanding of the present invention, reference may be made to the accompanying drawings, in which:

FIG. 1 is a schematic view of a fan drive system; and

FIG. 2 is a flowchart of software used with an embodiment of the fan drive system as described in FIG. 1.

BEST MODE FOR CARRYING OUT THE INVENTION

Referring first to FIG. 1, a system embodying certain of the principles of the present invention is generally indicated by the reference numeral 100. It should be understood that the following detailed description relates to the best presently known embodiment of the system 100. However, the system 100 can assume numerous other embodiments, as will become apparent to those skilled in the art, without departing from the appended claims.

In FIG. 1, the system 100 includes a heat exchanger 104 containing fluid coolant and a fan 102 associated with and adapted to move air past the heat exchanger 104. A pressure compensated pump 108 is connected to a reservoir 126 of hydraulic fluid. The pump 108 has a variable displacement controllable element 110 connected to and controlled by a load sensing member 112. A fluid motor 106 is connected to the pump 108 and is powered by hydraulic fluid supplied by the pump 108 from the reservoir 126.

A first sensor 118 is associated with the fluid coolant and is adapted to produce a first electrical signal in response to the temperature of the fluid coolant. The first sensor 118 is, for example, a temperature sensor of conventional design that is inserted into the fluid coolant reservoir 104 or is attached to a heat conductive portion of the reservoir 104.

A second sensor 120 is associated with the hydraulic fluid and is adapted to produce a second electrical signal in response to the temperature of the hydraulic fluid. The second sensor 120 is likewise of conventional design and is inserted into the fluid reservoir 126 or is associated with a thermally conducted portion of the reservoir 126.

A pressure reducing cartridge valve 128 has fluid ports 130,132 connected respectively to the fluid reservoir 126 and to the connection between the fluid motor 106 and pump 108. An electrically operable shuttle valve 134 has an electrically controlled input terminal 136 and hydraulic fluid ports 138,140 connected respectively to the pressure reducing cartridge valve 128 and to the load sensing member 112. A logic device 114 has input terminals 142,144 connected respectively to the first and second temperature sensors 118,120 and has an output terminal 146 connected to the shuttle valve electrically controlled input terminal 136.

The first sensor on 118 produces a first electrical signal in response to the temperature of the fluid coolant and the second sensor 120 produces a second electrical signal in response to the temperature of the hydraulic fluid. The logic means 114 receives the first and second electrical signals and controllably operates the pump 108 at a first relatively large displacement in response to at least one of the first and second electrical signals having a magnitude greater than respective first and second predetermined upper threshold values. Therefore, the combination of the logic means 114 and of the valve 116 controllably operate the fan 102 at a relatively high speed in response to the temperature of at least one of the fluid coolant and hydraulic fluid being greater than respective first and second predetermined upper temperature values. The logic means 114 controllably operates the pump 108 at a second relatively small displacement in response to both of the first and second electrical signals from the sensors 118,120 having magnitudes less than respective first and second predetermined lower threshold values. Therefore, the logic means 114 and the valve means 116 controllably operate the fan 102 at a second relatively slow speed in response to the temperature of each of the fluid coolant and hydraulic fluid being less than respective first and second predetermined lower temperature values.

Finally, the logic means 114 causes no change in the instant pump displacement value in response to at least one of the first and second electrical signals having a magnitude between the respective first and second predetermined upper and lower threshold values and to neither of the first and second electrical signals having a magnitude greater than the respective first and second predetermined upper threshold values. Therefore, the logic means 114 and valve means 116 controllably continue to operate the fan 102 at the instant fan speed in response to the temperature of at least one of the fluid coolant and hydraulic fluid being between respective first and second predetermined upper and lower temperature values and to neither of the fluid coolant and hydraulic fluid temperatures being greater than the respective first and second predetermined upper temperature values.

In vehicle system which includes an air conditioner 122, the system 100 includes a third temperature sensor 124 for producing a third electrical signal in response to operational status of the air conditioner 122. The logic means 114 in this embodiment operates the pump 108 at the first relatively large displacement in response to the third electrical signal from the third sensor 124 having a value indicating the air conditioner 122 is in operation. In other words, the fan 102 is operated at the relatively high speed in response to the air conditioner being in operation.

As is conventional in hydraulic drive circuits of the type described above, the system advantageously includes a hydraulic fluid heat exchanger 148 and a check valve 150. In normal operation, the hydraulic fluid flows through the heat exchanger 148 where it is cooled in a conventional matter. In the event that the heat exchanger 148 is unable to handle the entire flow of hydraulic fluid, the check valve 150 permits a bypass operation to occur whereby the excess hydraulic fluid bypasses the heat exchanger 148. This sort of hydraulic fluid cooling system is well known in the art.

Operation of the logic means 114 is now discussed as it pertains to the system described in FIG. 1 and making particular reference to the flowchart set forth in FIG. 2. The flowchart of FIG. 2 illustrates a computer software program for implementing the preferred embodiment of the present invention. The program depicted in this flowchart is particularly well adapted for use with a microcomputer and the associated components described herein. Any suitable microcomputer may be utilized in practicing an embodiment of the present invention. This flowchart constitutes a complete and workable design of the preferred software program which has been reduced to practice on an actual microcomputer system. The software program may be readily coded from this detailed flowchart using the appropriate instruction set associated with any particular microprocessor. The process of writing software code from flowcharts such as FIG. 2 is a mere mechanical step for one skilled in the art.

The following abbreviations are used in the blocks of the flowchart set forth in FIG. 2:

a/c = air conditioner
aecolt = actual engine coolant temperature
ecoltu = engine coolant temperature upper limit
ecoltl = engine coolant temperature lower limit
ahoilt = actual hydraulic oil temperature
hoiltu = hydraulic oil temperature upper limit
hoiltl = hydraulic oil temperature lower limit Beginning at the block 202, in those systems having an air conditioner the logic means 114 reads the status of the air conditioner switch at the block 204. If the air conditioner switch is "on", as determined at the block 206, control passes immediately to the block 208 where the fan control solenoid 134 is turned "off" causing the fan 102 to operate at maximum speed. The software routine ends at the block 210.

In the event the air conditioner switch is not "on", or in those cases where no air conditioner exists on the vehicle, control instead proceeds to the block 212 where the temperature of the engine coolant is compared with the engine coolant temperature upper limit. If the coolant temperature is greater than or equal to the reference point, control again passes to the block 208 causing the fan to operate at full speed. If the temperature is less than the upper coolant temperature limit, control passes to the block 214 where the temperature of the hydraulic fluid is compared with the hydraulic oil upper temperature limit. If the actual temperature of the hydraulic fluid is greater than or equal to the upper set point limit, control again passes to the block 208 where the fan is caused to operate at top speed.

In the event that neither the engine coolant nor hydraulic oil temperatures are greater than or equal to the respective set point upper limit values, control passes to the block 216 where the hydraulic oil temperature is compared with a lower oil temperature limit. If the hydraulic oil temperature is greater than the lower limit, control passes directly to the end block 210. In other words, if the hydraulic oil temperature is in a region between the upper and lower limits for the temperature value of the hydraulic oil, the fan 202 is allowed to continue to operate at whatever speed it is presently operating at. In the event that the hydraulic oil temperature is less than the lower oil temperature setpoint, control passes to the block 218 where the engine coolant is compared with a lower limit value for the engine coolant temperature. Again, if the engine coolant is within the region between the upper and lower values, control passes to the end block 210 where the fan 102 is allowed to continue operating at its present speed.

In the event that all of the preceding tests finally indicate that neither the hydraulic oil nor the engine coolant temperature are above the respective lower temperature limits, control passes to the block 220 where the fan control solenoid 134 is turned "on" causing the fan speed to be reduced to a low value. It is only in this one particular circumstance that the block 220 is ever reached in the flowchart shown in FIG. 2, causing the fan to operate at the slower speed.

A more English oriented way of viewing the flowchart of FIG. 2 is set forth in the following pseudocode, comprising a series of tests and result statements. The temperature values used are for exemplary purposes only.

```
IF1 (A/C SW ON)
    ELS1 IF2   (actual engine coolant temp> =
               99 deg C.)
    ELS2 IF3   (actual hydr oil temp> = 80 deg C.)
    ELS3 IF4   (actual hydr oil temp> = 75 deg C.)
    ELS4 IF5   (actual engine coolant temp> =
               95 deg C.)
    ELS5 turn sol ON, reduce fan speed
    THN4 THN5 exit
    THN1 THN2 THN3 turn sol OFF, full fan speed
```

As is evident from the foregoing discussion of the flowchart in FIG. 2 and the pseudocode disclosed immediately above, the default condition for the fan 102 is to operate at a relatively high fan speed causing maximum cooling of the heat exchanger 104. In the event that neither the engine coolant nor the hydraulic fluid temperatures exceed minimum threshold values, the logic means 114 causes the hydraulic circuitry to reduce the fan speed to a relatively low speed. In the event that either the hydraulic oil or the engine coolant temperature exceed the respective upper threshold limits or the air conditioner is turned "on", the fan control speed is immediately raised to the relatively high value. In those cases where both the engine coolant and hydraulic oil temperatures are in the deadband regions between the respective upper and lower temperature values, the fan is allowed to continue to operate at whatever present speed exists until one of the temperature values moves to a range that causes the logic means 114 to take other action.

Industrial Applicability

Operation of the system 100 is best described in relation to its use on a vehicle, for example an industrial vehicle having a hydraulic system. Assuming initially that no signal is delivered from the logic means 114 to the electrically operable shuttle valve 134, the shuttle valve 134 is spring biased in a position sufficient to connect the output of the pump 108 to the load sensing member 112 through the valve 134. This causes the variable displacement controllable element 110 to cause the pump 108 to produce a relatively large flow of hydraulic fluid through the fluid motor 106 and causes the fan 102 to operate at a relatively high speed. This is the default condition of the system and insures, should a circuit component become defective, that the fan 102 will maintain maximum air flow through the heat exchanger 104. In the event that all of the conditions of the flowchart in FIG. 2 are satisfied such that the flowchart reaches the block 220, a signal is produced at the logic means output terminal 146 and is delivered to the electrical input 136 of the shuttle valve 134. This causes the shuttle valve 134 to shift positions such that the pressure reducing cartridge valve 128 comes into operation. The cartridge valve 128 alters the pressure applied to load sensing member 112 and causes the variable displacement controllable element 110 to move to a position that causes the pump 108 to produce a relatively lower hydraulic fluid flow through the fluid motor 106. In turn, this reduces the speed of the fan 102 and the volume of the air delivered to the heat exchanger 104.

The hydraulic circuitry and other components utilized in the design of the system 100 are conventional and are well known in the art. It is the unique application of these components in a circuit that solves the problems set forth herein that forms the basis for the instant invention.

Other aspects, objects, advantages and uses of this invention can be obtained from a study of the drawings, the disclosure and the appended claims.

I claim:

1. A system for operating a fan to move air past a heat exchanger containing fluid coolant, said fan being operatively connected to a fluid motor powered by hydraulic fluid supplied from a pressure compensated pump having a variable displacement controllable element connected to and controlled by a load sensing member, comprising:

means for controllably operating said fan at a relatively high speed in response to the temperature of at least one of said fluid coolant and hydraulic fluid being greater than respective first and second predetermined upper temperature values;

means for controllably operating said fan at a second relatively slow speed in response to the temperature of each of said fluid coolant and hydraulic fluid being less than respective first and second predetermined lower temperature values; and, means for controllably continuing to operate said fan at the instant fan speed in response to the temperature of at least one of said fluid coolant and hydraulic fluid being between said respective first and second predetermined upper and lower temperature values and to neither of said fluid coolant and hydraulic fluid temperatures being greater than said respective first and second predetermined upper temperature values.

2. A system for operating a fan to move air past a heat exchanger containing fluid coolant, said fan being operatively connected to a fluid motor powered by hydraulic fluid supplied from a pressure compensated pump having a variable displacement controllable element connected to and controlled by a load sensing member, comprising:

first sensor means for producing a first electrical signal in response to the temperature of said fluid coolant;

second sensor means for producing a second electrical signal in response to the temperature of said hydraulic fluid;

logic means for receiving said first and second electrical signals, said logic means being operatively associated with said pump load sensing member, wherein said logic means controllably operates said pump at a first relatively large displacement in response to at least one of said first and second electrical signals having a magnitude greater than respective first and second predetermined upper threshold values, at a second relatively small displacement in response to both of said first and second electrical signals having magnitudes less than respective first and second predetermined lower threshold values, and wherein said logic means makes no change in the instant pump displacement value in response to at least one of said first and second electrical signals having a magnitude between said respective first and second predetermined upper and lower threshold values and to neither of said first and second electrical signals having a magnitude greater than said respective first and second predetermined upper threshold values.

3. A system, as set forth in claim 2, wherein said system is associated with a vehicle having an air conditioner and includes third sensor means for producing a third electrical signal in response to the operational status of said air conditioner, and wherein said logic means operates said pump at said first relatively large displacement in response to said third electrical signal having a value indicating that said air conditioner is in operation.

4. A system, comprising:

a heat exchanger containing fluid coolant;

a fan associated with and adapted to move air past said heat exchanger;

a reservoir of hydraulic fluid;

a pressure compensated pump connected to said reservoir and having a variable displacement controllable element connected to and controlled by a load sensing member;

a fluid motor connected to said pump and powered by hydraulic fluid supplied by said pump from said reservoir;

a first sensor associated with said fluid coolant and adapted to produce a first electrical signal in response to the temperature of said fluid coolant;

a second sensor associated with said hydraulic fluid and adapted to produce a second electrical signal in response to the temperature of said hydraulic fluid;

a pressure reducing cartridge valve having fluid ports connected respectively to said reservoir and to the connection between said fluid motor and said pump;

an electrically operable shuttle valve having an electrical control input terminal, and having hydraulic fluid ports connected respectively to said pressure reducing cartridge valve and to said load sensing member; and, a logic device having input terminals connected respectively to said first and second temperature sensors, and an output terminal connected to said shuttle valve electrical control input terminal.

5. A method for operating a fan to move air past a heat exchanger containing fluid coolant, said fan being operatively connected to a fluid motor powered by hydraulic fluid supplied from a pressure compensated pump having a variable displacement controllable element connected to and controlled by a load sensing member, comprising the steps of:

controllably operating said fan at a first relatively high speed in response to at least one of said fluid coolant and hydraulic fluid temperatures being greater than respective first and second predetermined upper temperature values;

controllably operating said fan at a second relatively slow speed in response to each of said fluid coolant and hydraulic fluid temperatures being less than respective first and second predetermined lower temperature values; and, controllably continuing to operate said fan at the instant fan speed in response to at least one of said fluid coolant and hydraulic fluid temperatures being between said respective first and second predetermined upper and lower temperature values and to neither of said fluid coolant and hydraulic fluid temperatures being greater than said respective first and second predetermined upper temperature values.

6. A method for operating a fan to move air past a heat exchanger containing fluid coolant, said fan being operatively connected to a fluid motor powered by hydraulic fluid supplied from a pressure compensated pump having a variable displacement controllable element connected to and controlled by a load sensing member, comprising the steps of:

producing a first electrical signal in response to the temperature of said fluid coolant;

producing a second electrical signal in response to the temperature of said hydraulic fluid;

receiving said first and second electrical signals;

controllably operating said pump at a first relatively large displacement in response to at least one of said first and second electrical signals having a magnitude greater than respective first and second predetermined upper threshold values;

controllably operating said pump at a second relatively small displacement in response to both of said first and second electrical signals having magnitudes less than respective first and second predetermined lower threshold values; and, controllably continuing to operate said pump at the instant pump displacement value in response to at least one of said first and second electrical signals having a magnitude between said respective first and second predetermined upper and lower threshold values and to neither of said first and second electrical signals having a magnitude greater than said respective first and second predetermined upper threshold values.

* * * * *